United States Patent [19]

Hasegawa et al.

[11] 4,308,415
[45] Dec. 29, 1981

[54] PROCESS FOR REFINING A MOLTEN METAL AND AN APPARATUS THEREFOR

[75] Inventors: Kazumasa Hasegawa; Minao Ito, both of Tokai; Saburo Sugiura, Nagoya; Kiyoichi Yamano; Shizunori Hayakawa, both of Tokai, all of Japan

[73] Assignee: Daido Tokushuko Kabushiki Kaisha, Aichi, Japan

[21] Appl. No.: 100,433

[22] Filed: Dec. 5, 1979

[30] Foreign Application Priority Data

Dec. 27, 1978 [JP] Japan ................................ 53-160068
Jun. 6, 1979 [JP] Japan ................................ 54-73352

[51] Int. Cl.³ .............................................. C21C/5/52
[52] U.S. Cl. ........................................ 13/9 R; 75/12
[58] Field of Search .......................... 75/10-12; 13/9 R

[56] References Cited

U.S. PATENT DOCUMENTS

3,390,979 7/1968 Greene .................................... 75/11
3,615,349 10/1971 Blelock ................................... 75/11
3,708,599 1/1973 Krause .................................... 75/12

Primary Examiner—Peter D. Rosenberg
Attorney, Agent, or Firm—Browdy and Neimark

[57] ABSTRACT

Refining method of molten metal which employs a refining apparatus provided with a tiltable refining vessel, a tuyere formed therein for blowing inert gas and/or flux or further sometimes additive alloy component(s), with the aid of inert gas into the molten metal, and a suitable number of electrodes for heating the molten metal and flux, for the purpose of performing a first refining process of carrying out the heating of the molten metal and the flux with the electrodes and a second refining process of tilting the vessel for blowing into the molten metal inert gas and others from the tuyere, whereby harmful or unnecessary metallic and/or non-metallic impure components can be removed for improving the quality of the article.

7 Claims, 12 Drawing Figures

PROCESS FOR REFINING A MOLTEN METAL AND AN APPARATUS THEREFOR

BACKGROUND OF THE INVENTION

This invention relates to a process for refining a molten metal and an apparatus therefor, and more particularly to a secondary refining process and an apparatus therefor, wherein harmful or unnecessary impurities contained in a molten metal in the form of non-metallic components such as sulfur (S), oxygen (O), hydrogen (H), nitrogen (N), etc., and metallic components such as lead (Pb), zinc (Zn), bismuth (Bi), tellurium (Te), etc. can be reduced to tiniest traces effectively and in an extremely short time as well.

In the metals and alloys obtained by melting, harmful or unnecessary metallic and non-metallic components, in addition to essential metallic components, are often contained owing to the choice of the materials utilized. And it is well known that impurities contained in a molten metal such as sulfur, oxygen, hydrogen, nitrogen, etc. largely affect the quality of the final products. That is why a secondary refining process is often carried out, which executes an extra purification of the molten metal taken out of a melting furnace.

As conventional secondary refining processes RH, DH, FINKL-MOHR, LF etc., are widely known. Among them RH and DH methods are superior in degassing, but not suitable for promoting desulfurization and deoxidation by means of adding flux, and not capable of maintaining heat of the molten metal. Consequently it becomes necessary to heighten the temperature of the discharged molten metal in the primary furnace, for example an electric arc furnace, which inevitably sacrifices the efficiency of the primary furnace and the cost of the refractory materials therefor. And FINKL-MOHR and LF (ladle furnace) methods are capable of executing reducing-refining with their heating apparatus equipped with electrodes, and also adaptable to the gas blowing. They are, however, inherently weak in the capacity of stirring the molten metal, because the ladle itself works as a refining furnace and a porous plug is utilized. They are consequently disadvantageous in their low refining efficiency.

Impurities contained inevitably in the molten metals, in particular, in the molten steel, for example, metallic components such as small amounts of Pb, Zn, etc., are harmful to the quality of the obtained products. Degradation of the hot-workability, crack-sensibility of steel ingots, and degradation of the thermal fatigue life are well known as demerits caused by the impurities. It is essentially required to reduce, in the course of refining of the molten metals, such impurities to a low level where they do no harm to the quality of the products. According to the general belief Pb and Zn elements must be less than 15 p.p.m., and Bi and Te elements are allowed at a level of 5 p.p.m. In austenite stainless steels containing Ni and Cr, for example, cracking in the course of hot-working can be actually prevented at the content level of 15 p.p.m. of Pb and Zn and 5 p.p.m. of Bi and Te.

According to the conventional actual manufacturing method, application of oxidizing-refining to the molten metals in a primary furnace like an electric arc furnace enables removal of the above-mentioned unnecessary elements relatively easily, because they produce oxidized substances of low boiling point. In cases of not employing oxidizing-refining, that is to say cases wherein oxidizing-refining is not needed because of obtainability of the combination of required ingredients to some extent by means of proper arrangement of materials such as in high carbon steel or high alloy steel, harmful elements must be prevented by controlling the material arrangement or removed by any other methods than the oxidizing-refining from the molten metal. In the prior art removing the harmful metallic elements from the molten metal has been extremely difficult.

SUMMARY OF THE INVENTION

It is a primary object of this invention, which was made from the above-mentioned background, to provide a method or process for refining a molten metal and an apparatus therefor.

It is another object of this invention to provide a secondary refining method and an apparatus therefor, wherein impurities in the molten metal, such non-metallic components (elements) as S, O, H, N, etc. and such metallic components (elements) as Pb, Zn, Bi, Te, etc., can be reduced to a trace amount effectively in an extremely short period of time.

It is further object of this invention to provide a method, and an apparatus therefor, of removing harmful and unnecessary metallic and non-metallic components (elements) even to the least possible trace amount by a refining, executed under an inert atmosphere, employing electrode heating and compulsory stirring accompanied by the blowing of an inert gas or gases.

Other objects of this invention will become apparent to those skilled in the art from the following detailed description of the preferred embodiments when read in connection with the accompanying drawings. p For attaining those objects this invention must include the steps of:

(a) charging the molten metal to be refined with some flux into a refining vessel provided with at least heating electrodes and an inert gas blowing means or device;

(b) a first refining process causing the molten metal to be reacted with the flux by means of heating the molten metal with heating electrodes, while maintaining the interior of the refining vessel under the atmosphere of an inert gas;

(c) a second refining process which includes (i) tilting of the refining vessel for immersing the blowing nozzle of the inert gas blowing device in the molten metal and (ii) blowing the inert gas thereinto; and (d) taking out the thus refined molten metal from the refining vessel.

And the secondary refining apparatus in accordance with this invention employs, for preferably performing such a refining process, a tiltable refining vessel which is suitable for charging the molten metal to be refined and the flux, a suitable number of electrodes arranged in the upper portion of the refining vessel for heating the molten metal charged in the refining vessel, and an inert gas blowing device, the blowing nozzle of which device is not immersed in the molten metal when the molten metal has been charged, but immersed only when the vessel is tilted for the purpose of blowing the gas.

DETAILED DESCRIPTION OF THE PREFERRED EMBODIMENTS

Figure 4:
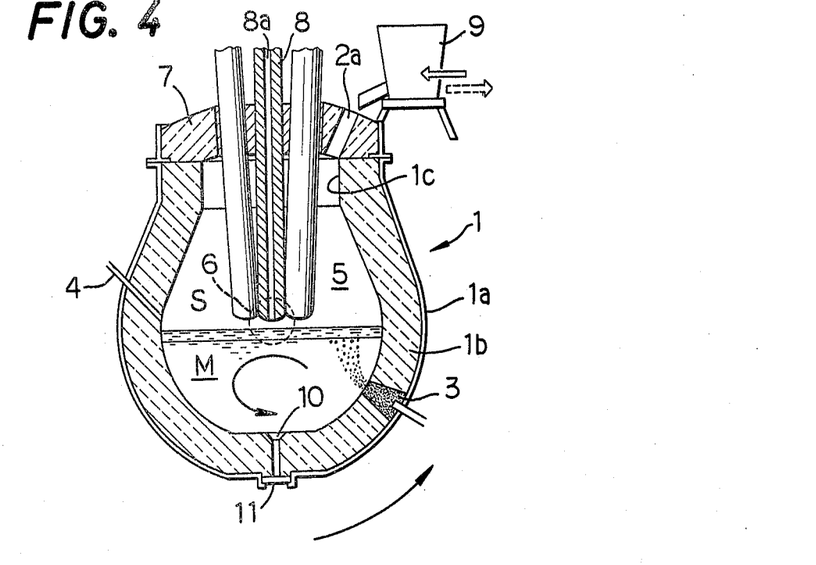
FIG. 4 is a view for showing the position of the refining apparatus of this invention in case of carrying out the first refining process.

For completing the present invention, a basic experiment was conducted with a refining apparatus similar to one illustrated in FIG. 4, which experiment proved that:

(1) When the molten metal is maintained in a relatively shallow layer, general de-oxidizing-and-sulfurizing refining can be achieved by means of performing a slag refining while blowing an inert gas of low pressure from a porous plug and giving heat to the molten metal by electrode heating.

(2) When the molten metal is maintained in a relatively deep layer, refining of de-oxidation, -sulfurization, -nitrogenation and -hydrogenation can be performed by means of blowing a flux into the molten metal with the aid of an inert gas of high pressure blown from the tuyere.

Figure 1:
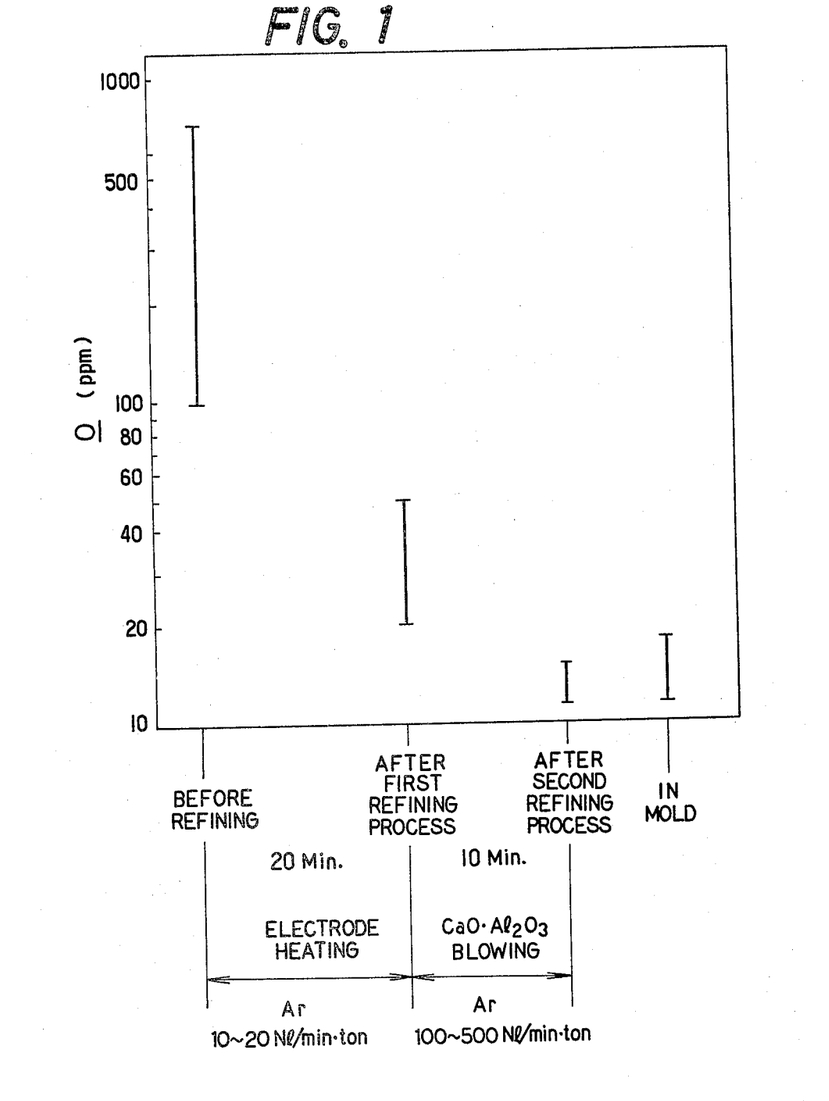
FIG. 1 is a graph showing the deoxidation effect in the refining apparatus of this invention.

In other words, it is possible, in the course of the first refining process of 20 minutes shown in FIG. 1, to reduce the oxygen content in the molten metal below 50 p.p.m. by means of (i) heating of the molten metal with a hollow electrode, (ii) making an atmosphere above the molten metal inert by blowing of argon gas on to the surface of the molten metal through a bore of the hollow electrode, and (iii) stirring the molten metal by the argon gas blown from the porous plug. And it has been further proved that the oxygen content can be reduced to as low as 15 p.p.m in the course of the second refining process about 10 minutes, wherein reaction between the molten metal and the flux is expedited, by means of blowing the flux such as CaO, Al$_2$O$_3$, etc. by the flow of argon gas from the tuyere into the molten metal, and an ingot of extremely low oxygen content can be obtained by pouring the molten metal into an casting mold under the atmosphere of inert gas.

Figure 2:
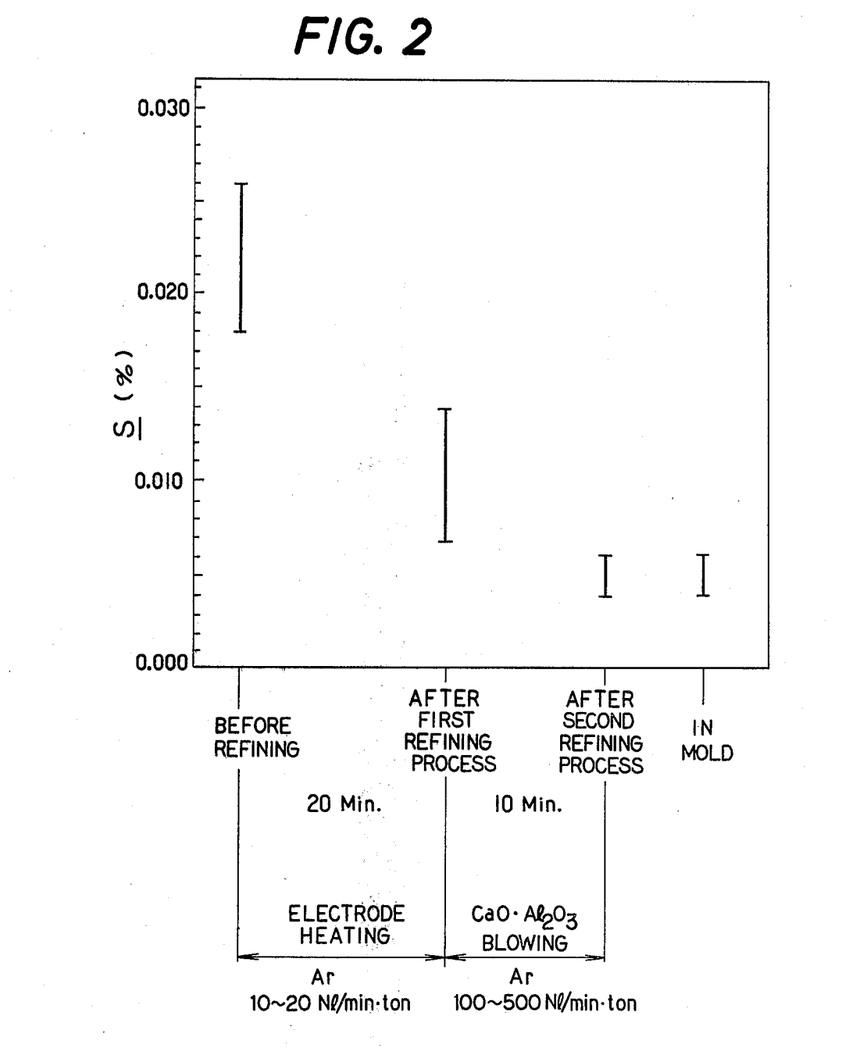
FIG. 2 is a graph showing the desulfurization effect in the refining apparatus of this invention.
Figure 3:
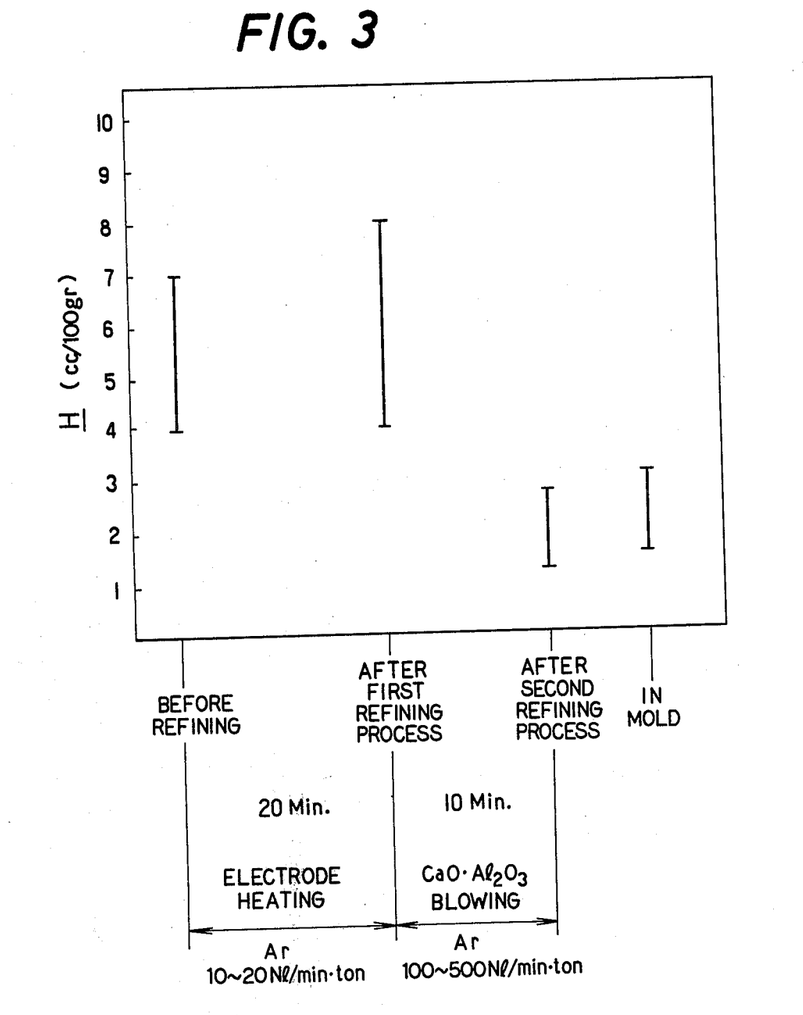
FIG. 3 is a graph showing the dehydrogenation effect in the refining apparatus of this invention.

Through the first and second experimental refining processes the sulfur content in the molten metal was reduced to 0.006% as shown in FIG. 2; and the rate of desulfurization reached 77% an average. It was also proved that only blowing of inert gas in the second refining was sufficient for the treatment of degassification. And the hydrogen content after the finish of the second refining could be reduced to below 2.7 cc/100 g as shown in FIG. 3, because the P$_{H_2O}$ in the vessel was reduced and the refining of dehydrogenation was carried out by the blowing of large amount of argon, throughout the first and second refining courses.

An example of refining process in accordance with this invention, based on the experimental result above-mentioned, is illustrated ranging FIG. 4 through FIG. 7.

A refining vessel 1 of pot type employed there was made of an outer shell of iron and a lining 1b of refractory, and it could be turned to be tilted, as shown in FIGS. 4-7, about a shaft 6 (vessel turning axis) attached to the side thereof at a substantially central position by means of a rotating device well known such as gears, motor, driving cylinder, etc. (not shown). An upper opening 1c of the vessel 1 is for operation of, such as charging of molten metal, putting-in flux, removing slag, or dust collecting. It also may be used as an electrode inserting opening when the electrode heating is carried out. Actually three hollow electrodes 8, having an axial through-bore 8a for passing inert gas into an inner refining chamber 5 of the vessel 1, are inserted through a main hole 2 formed in a furnace lid 7 made of refractories. The furnace lid 7 is also provided with a sub-hole 2a for charging the flux and/or additional alloy component(s) therethrough supplied from a removably disposed reservoir 9 of flux and/or additional alloy component(s).

Furthermore, a tuyere 4 is formed piercing through in the upper-portion of the vessel's one side wall downwardly slant toward inside, such that the inside opening thereof is positioned above the free surface of the molten metal M, more particularly speaking, the surface of the slag S, for not touching or contacting the molten metal M when the vessel 1 is uprightly postured as in FIG. 4. The tuyere 4 is for blowing inert gas such as argon or nitrogen and charging along therewith flux, deoxidant(s) and additional alloy component(s) such as NiO, MoO$_3$, WO$_3$, Ca powder, Mg powder, Ca-Si alloy, etc.; so the tuyere 4 is formed steeply (sharply) slanted such that even when the vessel 1 is tilted to the extent as in FIG. 5 the inert gas can be effectively blown deep into the lower part of the molten metal M in a slant downward direction. Numeral 3 designates a porous plug, through which any necessary gas such as inert gas can be blown into the molten metal M when the arc heating is carried out by the electrodes 8. Numeral 11 designates a sliding nozzle, through which the molten metal M in the vessel 1 can be discharged into a ladle or casting mold when a blockade member is shifted to communicate a pouring gate 10 of the vessel 1 with the outside.

Refining method applied in the refining of a molten alloyed steel which was carried out in a refining apparatus of the above-mentioned structure will be described next.

After having charged the molten steel M into the vessel 1 maintained at the upright position as in FIG. 4, while blowing on the other hand argon gas through the porous plug 3, so that the vessel inside may be filled with the atmosphere of argon gas, the furnace lid 7 of refractories is fastened.

Then the flux reservoir 9 is shifted in the direction of the arrow (solid line in FIG. 4), followed by charging through the sub-hole 2a of a basic flux S of, for example, CaO—CaF$_2$—Al$_2$O$_3$—SiO$_2$ series or CaO—Al$_2$O$_3$—SiO$_2$ series into the molten steel M and blowing of argon gas through the porous plug 3 into the molten steel M. While stirring the molten steel M by the blown argon gas in the direction of the arrow, the arc heating is carried out by the electrodes 8 of graphite to maintain the temperature of the molten steel M at a sufficient level needed for the second refining process.

In the course of this process inert gas is blown through the bore 8a of the hollow electrodes 8, too, thereby reaction between the flux S and molten steel M is also performed right below the electrodes 8, which experimentally brought about the result of reducing the impure elements in the molten steel M such as sulfur, oxygen, etc. to a trace amount in an extremely short span of time.

It is also possible to put in the course of refining a suitable amount of alloy component(s) from the reservoir 9, through the sub-hole 2a, into the molten steel M with the purpose of adjusting the composition of the alloyed molten steel M aimed.

When the refining and adjusting of the alloy composition has been finished, the reservoir 9 is shifted in the direction of the dot-lined arrow, followed by removing or lifting of the electrodes 8. And the vessel 1 is rotated in the arrowed direction as far as the position shown in FIG. 5. Strongly blown inert gas and flux from the tuyere 4 into the molten steel M for stirring the same expedite the reaction with the flux S, which rapidly progresses the de-sulfurizing-and-oxidizing refining.

In the meantime foams of the rising-up inert gas allows nitrogen and hydrogen in the molten steel M to diffuse thereinto.

Figure 6:
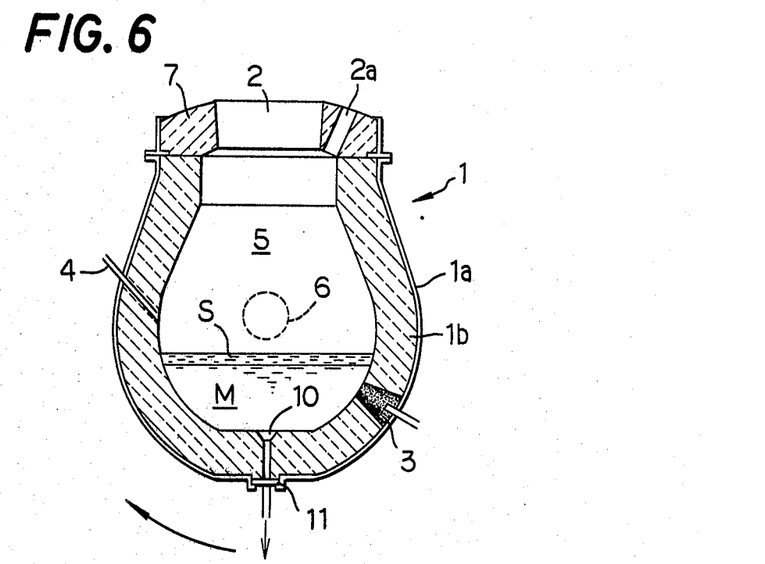
FIG. 6 is a view showing the position of the refining apparatus of this invention in case of carrying out the discharging process of the molten metal.
Figure 7:
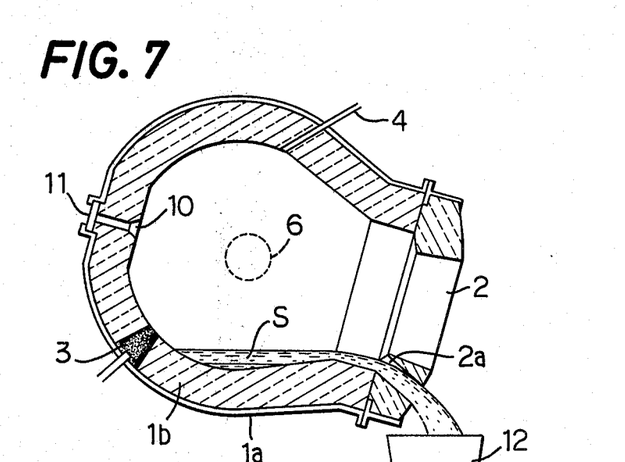
FIG. 7 is a view showing the position of the refining apparatus of this invention in case of carrying out the molten slag exhausting process.

Upon having finished the above-mentioned refining process the vessel 1 is rotated in the direction of the arrow back to the position illustrated in FIG. 6. Then the molten steel M is poured into a casting mold (not shown) through the sliding nozzle 11. Then the vessel 1 is rotated again to be turned to the position in FIG. 7 for exhausting the slag S into a slag ladle 12.

An Example of manufacturing the commercially available SCM 420 steel [JIS-G-4108(1979)] will be explained in accordance with the operational conditions shown in Table 1.

TABLE 1

| Sort of Steel | C | Si | Mn | P | S | Cu | Ni | Cr | Mo |
|---|---|---|---|---|---|---|---|---|---|
| SCM 420 (%) | 0.18 −0.23 | 0.15 −0.35 | 0.06 −0.85 | <0.030 | <0.030 | <0.30 | <0.25 | 0.90 −1.20 | 0.15 −0.30 |

| Blowing Gas | Ar Gas |
|---|---|
| Charged Material | FeSi, FeMn, MCr → System CaCO$_3$—CaF$_2$ flux; System CaO—Al$_2$O$_3$ flux |

Figure 5:
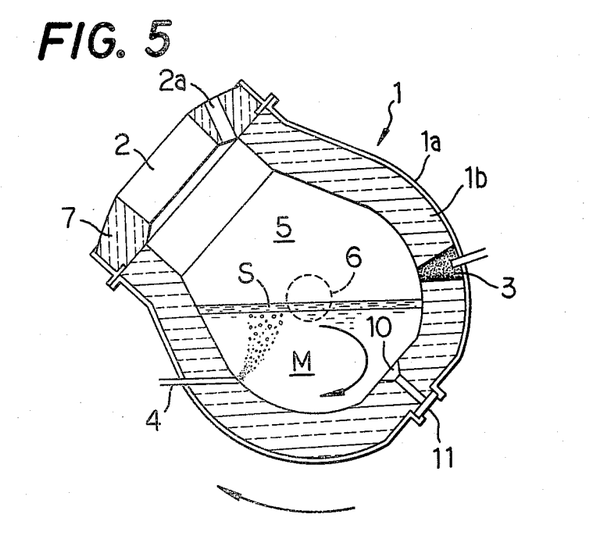
FIG. 5 is a view for showing the position of the refining apparatus of this invention in case of carrying out the second refining process.

| Timing | Charge Molten Steel | First Refining | Second Refining | Discharge |
|---|---|---|---|---|
| Position of Vessel | | Refer to FIG. 4 | Refer to FIG. 5 | Refer to FIG. 6 |
| Ingredients of the Molten Steel (%) C | | 0.19 | 0.20 | 0.20 | 0.20 |
| Si | | 0.020 | 0.30 | 0.30 | 0.30 |
| Mn | | 0.055 | 0.75 | 0.75 | 0.75 |
| P | | 0.015 | 0.015 | 0.015 | 0.015 |
| S | | 0.025 | 0.011 | 0.005 | 0.005 |
| Ni | | 0.15 | 0.15 | 0.15 | 0.15 |
| Cr | | 0.95 | 1.10 | 1.10 | 1.10 |
| Mo | | 0.25 | 0.25 | 0.25 | 0.25 |
| O | | 0.022 | 0.0030 | 0.0013 | 0.0013 |
| H (ppm) | | 5.8 | 5.8 | 1.8 | 1.8 |
| N | | 0.01 | 0.01 | 0.005 | 0.005 |
| Temperature of Molten Steel (°C.) | 1,600 | 1,730 | 1,645 | 1,640 |

In the first refining process, SCM 420 molten steel M melted in a separate arc melting furnace is poured into the refining vessel 1 which is held in a position illustrated in FIG. 4, followed by a blowing of inert gas through the bore 8a of the electrodes 8 while heating supplementarily the molten steel M by supplying power of arc heating. Then system CaCO$_3$—CaF$_2$ flux S and additional alloy material which should be charged from the reservoir 9 through the opening 2a are heated for melting. Argon gas blown through the porous plug 3 under this circumstance at the rate of 15 l/min. ton brings about the molten steel M continuously to right under the electrodes 8 to raise the temperature of the same. De-oxidizing-and-sulfurizing refining of the molten steel M and the slag S progresses to reduce O content from 0.022% down to 0.003% and S content from 0.025% to 0.011%.

Thereafter in this experiment the electrodes 8 were removed and the reservoir 9 was moved in the direction of the dot-lined arrow, followed by the tilting rotation of the vessel 1 as far as the position shown in FIG. 5 for preparing the second refining process.

In this process system CaO—Al$_2$O$_3$ flux was intermittently blown into the molten steel M accompanied by argon gas. Soon after that large amount of argon gas (500 l/min.ton) was blown into the molten steel M to carry out the de-oxidizing-and-sulfurizing refining while strongly stirring the same. O content was reduced from 0.003% to 0.001% and S content from 0.011% to 0.005%. And H was reduced from 5.8 cc/100 g to 1.8 cc/100 g and N, too, from 0.010% to 0.005%.

This invention showed in this way great characteristic feature, which never could be seen in the prior art, i.e., refining in the arc melting furnace, through the first and second refining in obtaining the molten steel of low oxygen, sulfur, and hydrogen content.

The next step is to turn the vessel 1 to a posture shown in FIG. 6 for being fixed there to pour the molten steel M, by opening the sliding nozzle 11, through the pouring gate 10 into a mold or a ladle (not shown). Operation of this sort is preferable to be carried out under the atmosphere of inert gas.

Figure 9:
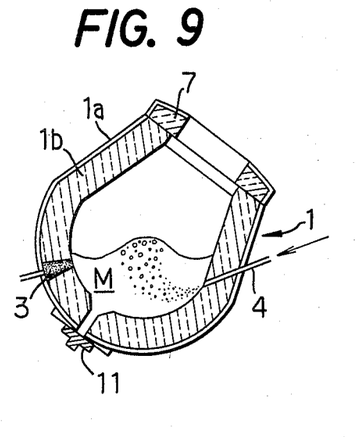

Afterwards the refining vessel 1 is turned again in the direction of the arrow to be tilted to the position shown in FIG. 9 for exhausting the slag S through a slag exhaust opening 2a to a slag ladle 12. Incidentally it is also possible to carry out this operation of pouring the molten steel only by tilting the vessel 1, without opening and passing the sliding nozzle 11.

It has further been found, in the further study in respect to the refining operation employing the refining apparatus provided with heating, tilting, and gas blowing means as mentioned above, that the blowing of the inert gas(es) in the course of refining could effectively remove harmful metallic contents in the molten steel such as Pb, Zn, Bi, Te, etc., in particular, elements of high vapor pressure. This enabled the removal of harmful metallic substances contained in the molten steel almost completely.

Figure 8:
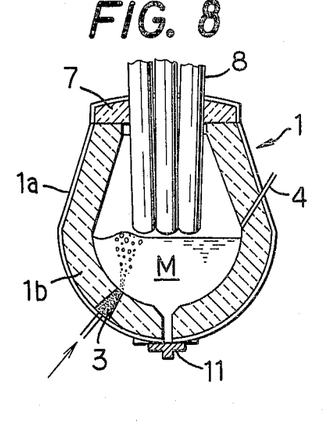
FIG. 8 and FIG. 9 are respectively a vertical sectional view of another embodiment of the refining vessel of this invention, particularly showing the state when heating and refining is performed.
Figure 10:
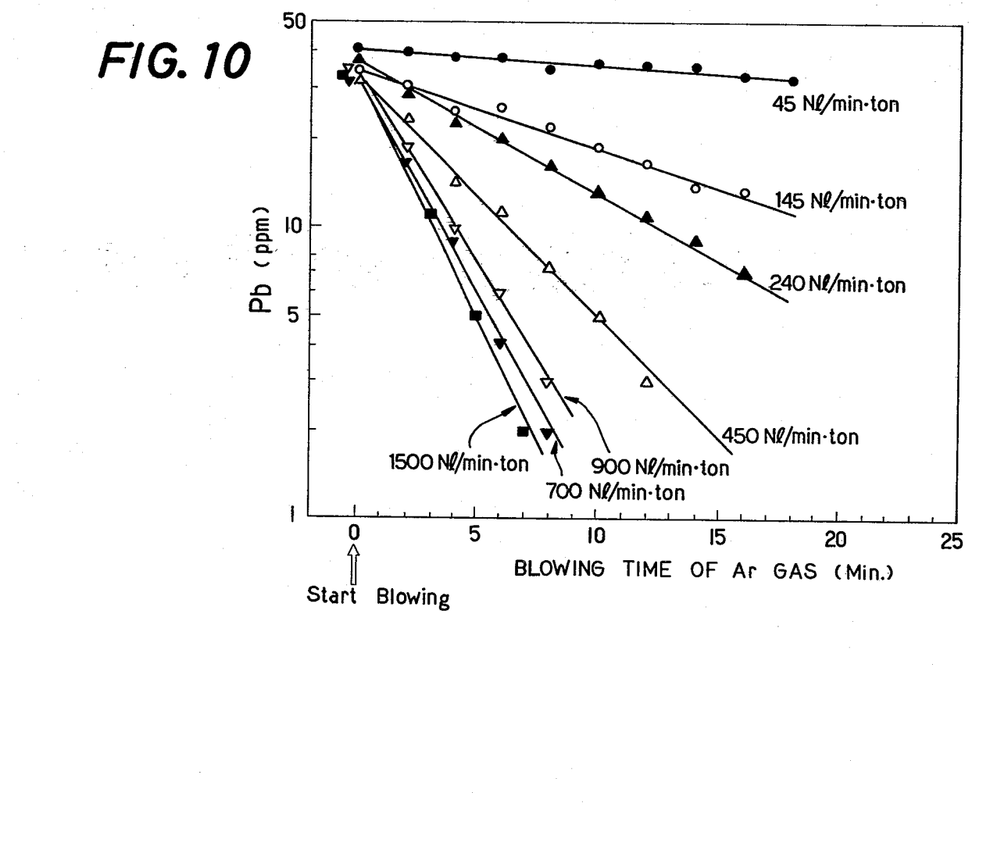
FIG. 10 and FIG. 11 are respectively a graph showing the relation between the Pb and Zn concentration and the blowing time of Ar gas under various blowing rate of Ar gas.
Figure 11:
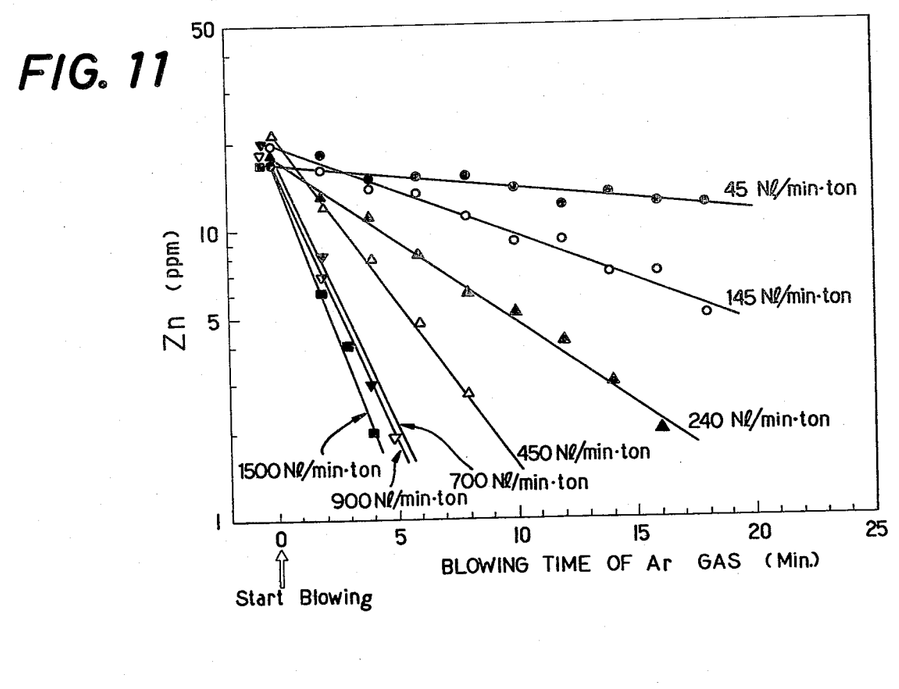
Figure 12:
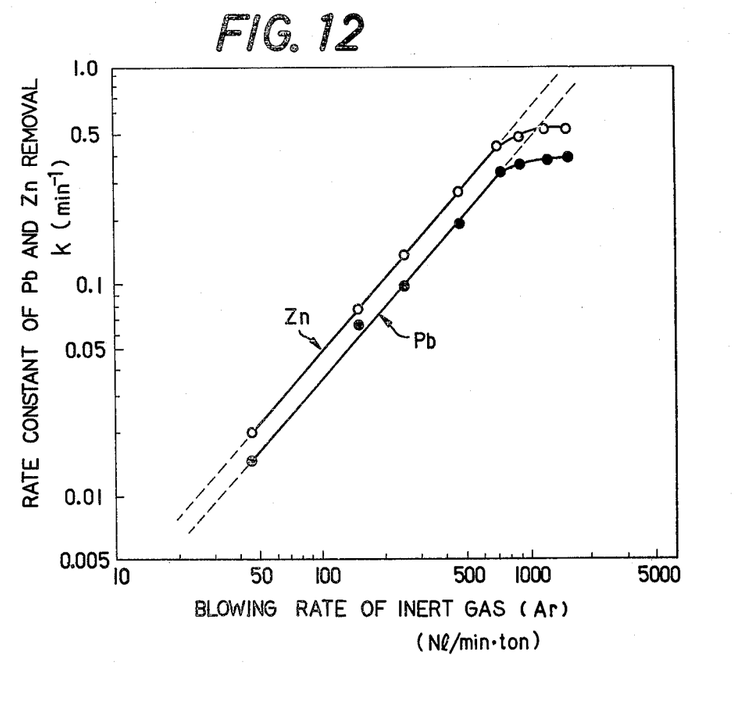
FIG. 12 is a graph showing the relation between the rate constant of Pb and Zn removal and the blowing rate of the inert gas (Ar).

An experimental result which was obtained from an argon gas treatment applied on a molten steel of JIS-G-4104 SCR 420 containing, as harmful elements, 30–40 p.p.m. Pb, 15-22 p.p.m. Zn, 10 p.p.m. or more Bi and Te, in a secondary refining apparatus of 3 ton capacity with the structure shown in FIGS. 8 and 9 is made into graphs of FIGS. 10 and 11. The result in FIGS. 10 and 11 are plotted regarding the relation between the time of blowing of the argon gas, which was blown at various rate from the tuyere 4, and the concentration of Pb or Zn in the molten steel. FIG. 12 shows the relation between the blowing rate of the inert gas (argon in this case) and the rate constant of Pb and Zn removal computed from the results of FIGS. 10 and 11 as follows:

$$ln \cdot \frac{C}{C_o} = -k \cdot t$$

wherein
C: Pb or Zn concentration
$C_o$: Pb or Zn initial concentration
t: time

As clearly can be seen in FIG. 12 rate constant (k) of Pb and Zn removal rapidly increases in proportion to the blowing speed of the inert gas (argon) up to 700 Nl/min.ton. But the varying of the rate constant of Pb and Zn removal in the range exceeding 700 Nl/min.ton, begins to dull. Under the blowing condition of the inert gas exceeding 700 Nl/min.ton the efficiency of Pb and Zn removal by the blown inert gas is degraded chiefly due to progressing of the temperature descending of the molten steel. Considering the cost of the expensive inert gas, the cost increase of the heating by the electrodes caused by the increase of heat loss, the minus elements of economical aspect appear conspicuous. Lowering of the blowing rate of the inert gas naturally deteriorates, on the other hand, the rate of Pb and Zn removal, i.e., brings about an efficiency degradation. Assume the lowest limit of this efficiency is 10 minutes, then the blowing rate of the inert gas, required to decrease the Pb/Zn concentration down to ½ of the initial concentration within 10 minutes, must be over 200 Nl/min.ton or so. It is therefore recommendable to settle the blowing rate of the inert gas (amount of the blown inert gas every second per 1 ton molten steel) from the inert gas blowing means such as a tuyere, necessary for performing Pb and Zn removal effectively, within the range 200–700 Nl/min.ton. As to other harmful metallic elements such as Bi, Te similar results were observed. At the blowing speed of 300 Nl/min.ton in case of Bi, descending of the content ratio from 12 p.p.m. down to 2 p.p.m. was obtained after 10 minutes. In case of Te, descending from 16 p.p.m. to 8 p.p.m. in ten minutes was observed.

As to the refining apparatus employed in the refining process of molten metals in accordance with this invention, those having the shape shown in FIGS. 8 and 9 are also recommendable as desired. The refining vessel 1 shown in FIGS. 8 and 9 is, at the molten metal M accommodating portion, of almost spherical and the upper portion above the surface of the molten metal M, when the vessel 1 is postured upright position, is of truncated cone, which largely features this type of vessel. Chief merits of this refining vessel reside in (1) diminishing the space of the refining chamber 5, which facilitates maintaining the same under non-oxidizing atmosphere; (2) consequently diminishing heat diffusion to outside of the furnace with the result of enhancing the effect of heat-refining; (3) facilitating exhaust of the slag by tilting the vessel 1 in a manner shown in FIG. 7. In FIGS. 8 and 9 common portions with those in the previous Figures the same numerals are alloted for omitting the superfluous explanation.

For removing harmful or unnecessary impurities, such as non-metallic or metallic components, in the refining process of molten metals, the amounts of argon or other inert gas blown from the porous nozzle 3 in the first refining is generally preferable to be in the range of 5-30 Nl/min per 1 ton of the molten metal, and the similar gas from the tuyere 4 in the second refining is recommendable to be in the range of 100–700 Nl/min per 1 ton of the molten metal.

The reducing-refining under the inert atmosphere in accordance with this invention, which is carried out with arc heating while stirring the molten metal strongly, is capable of, as mentioned above in greater detail, performing the manufacture of alloyed metal of high purity, largely contributing to the development of industry.

In place of the hollow electrodes of graphite employed in the arc heating in the above embodiment, solid graphite electrodes and plasma arc torches can be utilized. Mixing small amount of oxygen gas with the inert gas is good for performing decarburizing refining. It is also permissible to replace partly or entirely the argon gas by nitrogen gas. Transportation of the refining vessel 1 by a crane or a trailer, and receiving the molten metal from the blast furnace or pouring the molten metal from the vessel 1 directly into the ladle or the mold by the similar medium is possible. All of those processes are desirable to be carried out under the atmosphere of inert gas.

In the previous explanation the electrodes 8 were removed from the vessel 1 in the second refining, but instead they may be lifted to some extent, without being completely taken out, while the vessel 1 is tilted, provided that the electrodes 8 are not contacted with the molten metal M in the vessel 1.

Furthermore, the sign Nl/min should be understood to indicate a volume (l) of the inert gas under normal state, i.e., N.T.P. per a unit of time (min).

The present invention is by no means limited to the above-mentioned example (embodiment). Variations or modifications can be easily made for those skilled in the art without departing from the spirit and scope of the invention.

What is claimed is:

1. Refining apparatus for molten metal comprising:
    a refining vessel of the pot-type tiltable by rotation and which can be charged with flux and molten metal to be refined;
    at least one electrode generally vertically disposed in the upper portion of said refining vessel for heating the charged molten metal;
    a first inert gas blowing means for blowing an inert gas into the molten metal, said first gas blowing means comprising a blowing nozzle. exiting to the interior of said vessel above the molten metal level when the vessel is in the upright position, but which nozzle is immersed in the molten metal only when said refining vessel is tilted by rotation; and a second inert gas blowing means from which inert gas is blown into the molten metal contained in the refining vessel when said vessel is in the upright position prior to its being tilted.

2. Refining apparatus for molten metal claimed in claim 1, wherein said refining vessel comprises a lower portion of spherical shape for containing the molten metal and an upper portion of truncated cone shape connected to said lower portion.

3. Refining apparatus for molten metal claimed in claim 1, wherein said refining vessel is provided at the bottom portion thereof with a pouring gage for taking out the molten metal refined and at the upper portion thereof a slag exhausting opening for exhausting the slag produced in the refining process.

4. Refining apparatus for molten metal claimed in claim 1, said blowing nozzle of said first inert gas blowing means is a tuyere formed piercing through a side wall, at the upper portion, of the vessel sharply slanted from outside toward inside so that the inside opening of the tuyere is positioned above the free surface of the molten metal contained in the refining vessel, and said tuyere is capable of blowing, even when said refining vessel is tilted by rotation, inert gas deep into the molten metal in a slant downward direction.

5. Refining apparatus claimed in claim 1, wherein said refining vessel has an opening at the top thereof and said electrode generally vertically disposed therein is supported by a removable plug which closes the opening at the top of said vessel.

6. Refining apparatus claimed in claim 5, wherein said electrode is hollow, and means for passing an inert gas through said hollow electrode to the interior of said vessel above the level of the flux.

7. An apparatus claimed in claim 1, wherein said pot-type tiltable refining vessel is internally shaped such that the depth of the molten metal contained therein is shallower when said vessel is maintained in its upright position, and deeper when said vessel is tilted.

* * * * *